United States Patent
Kobayashi et al.

(10) Patent No.: US 12,401,094 B2
(45) Date of Patent: Aug. 26, 2025

(54) SEPARATOR FOR NON-AQUEOUS SECONDARY BATTERY AND NON-AQUEOUS SECONDARY BATTERY

(71) Applicant: TEIJIN LIMITED, Osaka (JP)

(72) Inventors: Tokimitsu Kobayashi, Osaka (JP); Hiroshi Sakurai, Osaka (JP); Satoshi Nishikawa, Osaka (JP)

(73) Assignee: TEIJIN LIMITED, Osaka (JP)

( * ) Notice: Subject to any disclaimer, the term of this patent is extended or adjusted under 35 U.S.C. 154(b) by 716 days.

(21) Appl. No.: 17/439,602

(22) PCT Filed: Mar. 23, 2020

(86) PCT No.: PCT/JP2020/012704
§ 371 (c)(1),
(2) Date: Sep. 15, 2021

(87) PCT Pub. No.: WO2020/189795
PCT Pub. Date: Sep. 24, 2020

(65) Prior Publication Data
US 2022/0149482 A1    May 12, 2022

(30) Foreign Application Priority Data

Mar. 20, 2019 (JP) ................. 2019-052383

(51) Int. Cl.
*H01M 50/489* (2021.01)
*H01M 10/0525* (2010.01)
(Continued)

(52) U.S. Cl.
CPC ....... *H01M 50/489* (2021.01); *H01M 50/409* (2021.01); *H01M 50/417* (2021.01);
(Continued)

(58) Field of Classification Search
CPC ............. H01M 50/489; H01M 50/409; H01M 50/417; H01M 50/423; H01M 50/443;
(Continued)

(56) References Cited

U.S. PATENT DOCUMENTS

2010/0021822 A1   1/2010   Ikemoto et al.
2012/0231323 A1   9/2012   Takagi et al.
(Continued)

FOREIGN PATENT DOCUMENTS

JP    11-123799 A       5/1999
JP    2001-229971 A     8/2001
(Continued)

OTHER PUBLICATIONS

English Translation of JP2014205344.*
(Continued)

*Primary Examiner* — Kiran Quraishi Akhtar
(74) *Attorney, Agent, or Firm* — Sughrue Mion, PLLC

(57) ABSTRACT

Provided is a separator for a non-aqueous secondary battery containing a porous substrate using a polyolefin porous film; and a heat-resistant porous layer that is provided only on one side of the porous substrate, and that contains a heat-resistant resin and a filler, in which a TD elastic modulus of the porous substrate is from 1.2 GPa to 5.0 GPa.

9 Claims, 2 Drawing Sheets

(51) Int. Cl.
*H01M 50/409* (2021.01)
*H01M 50/417* (2021.01)
*H01M 50/423* (2021.01)
*H01M 50/443* (2021.01)
*H01M 50/446* (2021.01)
*H01M 50/451* (2021.01)

(52) U.S. Cl.
CPC ....... *H01M 50/423* (2021.01); *H01M 50/443* (2021.01); *H01M 50/446* (2021.01); *H01M 50/451* (2021.01); *H01M 10/0525* (2013.01)

(58) Field of Classification Search
CPC ............ H01M 50/446; H01M 50/451; H01M 50/431; H01M 10/0525; H01M 10/052; Y02E 60/10
See application file for complete search history.

(56) References Cited

U.S. PATENT DOCUMENTS

| | | |
|---|---|---|
| 2015/0162585 A1 | 6/2015 | Pan et al. |
| 2015/0171398 A1* | 6/2015 | Roumi .............. H01M 10/4257 324/426 |
| 2015/0180002 A1 | 6/2015 | Nishikawa et al. |
| 2016/0043370 A1 | 2/2016 | Hatta et al. |
| 2016/0268570 A1* | 9/2016 | Wang .................. H01M 50/406 |
| 2016/0365559 A1 | 12/2016 | Yoshimaru et al. |
| 2016/0372728 A1 | 12/2016 | Yoshimaru et al. |
| 2017/0133653 A1 | 5/2017 | Lee et al. |
| 2017/0162849 A1 | 6/2017 | Marukami et al. |
| 2018/0130988 A1 | 5/2018 | Nishikawa et al. |
| 2018/0233726 A1 | 8/2018 | Nagao |
| 2018/0254455 A1 | 9/2018 | Yoshimaru et al. |
| 2019/0067748 A1 | 2/2019 | Saeki et al. |

FOREIGN PATENT DOCUMENTS

| | | | | |
|---|---|---|---|---|
| JP | 2001-283821 A | 10/2001 | | |
| JP | 2004-051692 A | 2/2004 | | |
| JP | 2011-044419 A | 3/2011 | | |
| JP | 2011-210436 A | 10/2011 | | |
| JP | 2014141644 | * 8/2014 | ............ | Y02E 60/10 |
| JP | 2014-205344 A | 10/2014 | | |
| JP | 2014205344 | * 10/2014 | ............ | B32B 27/32 |
| JP | 2015-111598 A | 6/2015 | | |
| JP | 2015-115321 A | 6/2015 | | |
| JP | 2017-139117 A | 8/2017 | | |
| JP | 2018-133244 A | 8/2018 | | |
| JP | 2018133244 | * 8/2018 | ............ | H01M 2/16 |
| JP | 2018-162438 A | 10/2018 | | |
| WO | 2012/005152 A1 | 1/2012 | | |
| WO | 2014/021290 A1 | 2/2014 | | |
| WO | 2014/148036 A1 | 9/2014 | | |
| WO | 2016/031492 A1 | 3/2016 | | |
| WO | 2016/056288 A1 | 4/2016 | | |
| WO | 2016/056289 A1 | 4/2016 | | |
| WO | 2017/146237 A1 | 8/2017 | | |

OTHER PUBLICATIONS

English Translation of JP2018133244.*
English Translation of JP2014141644.*
International Search Report for PCT/JP2020/012704, dated Jun. 23, 2020.
Gong Wen-zheng et al., "PPESK/PVDF Lithium-ion Battery Composite Separators Fabricated by Combination of Electrospinning and Electrospraying Techniques", Journal of Materials Engineering, Mar. 2018, vol. 46, No. 3, pp. 1-6 (1 page total) (Abstract Only).
Wang Dan et al., "An Experimental Study on the Characteristics of Separator Film in Lithium Ion Battery for Vehicles", Automotive Engineering, Oct. 2011, vol. 33, No. 10, 1 page total (Abstract Only).

* cited by examiner

SEPARATOR FOR NON-AQUEOUS SECONDARY BATTERY AND NON-AQUEOUS SECONDARY BATTERY

CROSS REFERENCE TO RELATED APPLICATIONS

This application is a National Stage of International Application No. PCT/JP2020/012704 filed Mar. 23, 2020, claiming priority based on Japanese Patent Application No. 2019-052383 filed Mar. 20, 2019.

TECHNICAL FIELD

The present disclosure relates to a separator for a non-aqueous secondary battery and a non-aqueous secondary battery.

BACKGROUND ART

Non-aqueous secondary batteries represented by lithium ion secondary batteries are widely used as power sources for portable electronic devices such as notebook-size personal computers, mobile phones, digital cameras and camcorders. Recently, for a non-aqueous secondary battery represented by a lithium ion secondary battery, an application thereof as a battery for electric power storage or electric vehicles is being reviewed due to the property of a high energy density thereof. With spread of non-aqueous secondary batteries, it has been increasingly required to enhance safety battery characteristics.

A separator which is one of members constituting a non-aqueous secondary battery requires such heat resistance that a film is not easily broken even when the temperature inside the battery is high in order to ensure safety of the battery. As a separator having improved heat resistance, a separator including a heat-resistant porous layer containing inorganic particles on a porous substrate of polyolefin microporous film is known, for example, as disclosed in Patent Documents 1 to 7.

Patent Document 1: Japanese Patent Application Laid-Open (JP-A) No. 2011-044419
Patent Document 2: Japanese Patent Application Laid-Open (JP-A) No. 2015-115321
Patent Document 3: International Publication No. 2014/148036
Patent Document 4: International Publication No. 2016/056289
Patent Document 5: International Publication No. 2016/056288
Patent Document 6: International Publication No. 2016/031492
Patent Document 7: International Publication No. 2017/146237

SUMMARY OF INVENTION

Technical Problem

Here, when a battery is manufactured, a laminated sheet in which a separator and an electrode are stacked is wound around a winding core to form a roll body, and the winding core is finally pulled out from the roll body. When the winding core is pulled out, in a case where the heat-resistant porous layer of the separator and the winding core are in close contact with each other, a phenomenon (hereinafter, it is also referred to as a falling-off failure.) in which the separator is pulled out in a shape like a bamboo shoot together with the winding core may occur. Therefore, the heat-resistant porous layer is formed only on one side of the porous substrate, and the porous substrate is wound while being in contact with the winding core, whereby the falling-off failure may be prevented.

However, when the heat-resistant porous layer is formed only on one side of the porous substrate, the heat-resistant porous layer shrinks or deforms, so a phenomenon (hereinafter, also referred to as a curling phenomenon) in which an end portion of the separator in TD (a direction orthogonal to a mechanical direction (MD) of the separator) is bent upward or downward with respect to a plane including a surface of the separator and is deformed easily occurs. When the curling phenomenon occurs in the separator, the curling phenomenon becomes a cause of a process trouble at the time of production the battery and affects the production yield of the battery.

The present disclosure has been made in view of the above problems.

An object of an embodiment of the present disclosure is to provide a separator for a non-aqueous secondary battery in which occurrence of a curling phenomenon is suppressed and manufacturability of a battery is improved in a separator in which a heat-resistant porous layer is formed on one side of a porous substrate.

An object of another embodiment of the present disclosure is to provide a non-aqueous secondary battery with improved production performance.

Solution to Problem

The specific solutions to the problem include the following embodiments.

[1] A separator for a non-aqueous secondary battery, the separator containing:
  a porous substrate using a polyolefin porous film; and
  a heat-resistant porous layer that is provided only on one side of the porous substrate, and that contains a heat resistant resin and a filler,
  wherein a TD elastic modulus of the porous substrate is from 1.2 GPa to 5.0 GPa.

[2] The separator for a non-aqueous secondary battery according to [1], wherein a ratio T1/T2 of a thickness T1 of the porous substrate to a thickness T2 of the heat-resistant porous layer is from 0.8 to 10.

[3] The separator for a non-aqueous secondary battery according to [1] or [2], wherein a mass of the heat-resistant resin in the heat-resistant porous layer is from 0.2 g/m$^2$ to 2.2 g/m$^2$.

[4] The separator for a non-aqueous secondary battery according to any one of [1] to [3], wherein each of a shrinkage ratio of MD at 150° C. and a shrinkage ratio of TD at 150° C. is within a range of from 0% to 32%.

[5] The separator for a non-aqueous secondary battery according to any one of [1] to [4], wherein the filler contains at least one selected from the group consisting of a metal oxide, a metal hydroxide, a metal nitride, a metal salt, and a clay.

[6] The separator for a non-aqueous secondary battery according to [5], wherein the filler includes barium sulfate or magnesium hydroxide.

[7] The separator for a non-aqueous secondary battery according to any one of [1] to [6], wherein an average primary particle diameter of the filler is from 0.005 μm to 1.0 μm.

[8] The separator for a non-aqueous secondary battery according to any one of [1] to [7], wherein the heat-resistant resin contains at least one selected from the group consisting of wholly aromatic polyamide, polyamideimide, poly(N-vinylacetamide), polyacrylamide, copolymerized polyether polyamide, polyimide and polyether imide.

[9] A non-aqueous secondary battery that obtains electromotive force by lithium doping and dedoping, the non-aqueous secondary battery containing:

a positive electrode;

a negative electrode; and the separator for a non-aqueous secondary battery according to any one of [1] to [8], the separator being disposed between the positive electrode and the negative electrode.

Advantageous Effects of Invention

According to an embodiment of the present disclosure, there is provided a separator for a non-aqueous secondary battery in which occurrence of a curling phenomenon is suppressed in the separator in which a heat-resistant porous layer is formed on one side of a porous substrate, and production performance of a battery is improved.

According to another embodiment of the present disclosure, there is provided a non-aqueous secondary battery with improved production performance.

DESCRIPTION OF EMBODIMENTS

Figure 1:
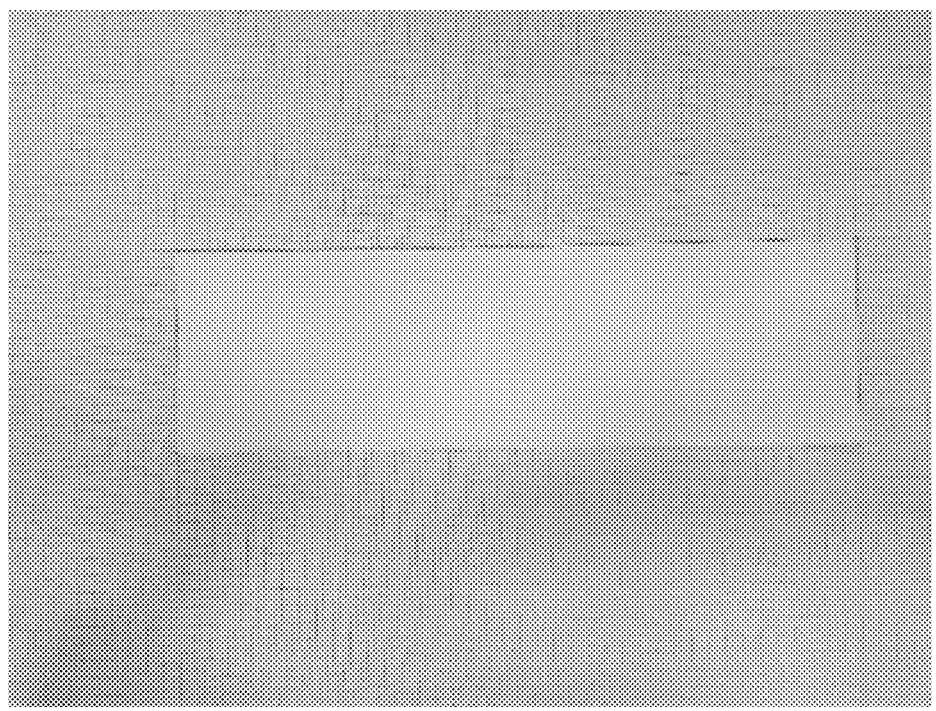
FIG. 1 is a photograph of a separator of Example 1 taken in plan view after standing for 10 minutes when a test for measuring a curling rate was conducted.

Hereinafter, the embodiments of the present disclosure will be described. Further, the description and the Examples thereof illustrate the embodiments, but do not limit the scope of the embodiments.

In the present disclosure, the numerical range denoted by using "to" represents the range inclusive of the number written before and after "to" as the minimum and maximum values. Regarding stepwise numerical ranges designated in the present disclosure, an upper or lower limit set forth in a certain numerical range may be replaced by an upper or lower limit of another stepwise numerical range described. Besides, an upper or lower limit set forth in a certain numerical range of the numerical ranges designated in the disclosure may be replaced by a value indicated in Examples.

In the present disclosure, the term "process" includes not only an independent process, but also the process which is not clearly distinguished from other processes but achieves the desired purpose thereof.

In the present disclosure, when the amount of each component in a composition is referred to and when a plurality of substances corresponding to each component are present in the composition, the total amount of the plurality of components present in the composition is meant unless otherwise specified.

In the present disclosure, a "MD" means a longitudinal direction (that is, the conveyance direction) in a porous substrate and a separator produced into a long shape, and is also referred to as a "machine direction". In addition, a "TD direction" means a direction orthogonal to the "MD", and is also referred to as a "transverse direction".

In the present disclosure, a combination of two or more preferred aspects is a more preferred aspect.

In the present disclosure, when there are a plurality of substances corresponding to each component in the composition, the amount of each component in a composition or a layer means the total amount of a plurality of substances present in the composition unless otherwise specified.

In the present disclosure, "% by mass" and "% by weight" have the same meaning, and "parts by mass" and "parts by weight" have the same meaning.

In the present disclosure, a heat-resistant resin refers to a resin having a melting point of 200° C. or higher, or a resin having no melting point and having a decomposition temperature of 200° C. or higher. That is, the heat-resistant resin in the present disclosure is a resin that is not melted or decomposed in a temperature range of lower than 200° C.

<Separator for Non-Aqueous Secondary Battery>

A separator for a non-aqueous secondary battery (also simply referred to as "separator") of the present disclosure includes a porous substrate which is composed of polyolefin microporous film, and a heat-resistant porous layer provided only on one side of the porous substrate.

In the separator of the present disclosure, the heat-resistant porous layer contains a heat-resistant resin and a filler, and the porous substrate has a TD elastic modulus of from 1.2 GPa to 5.0 GPa.

According to such a separator of the present disclosure, curling can be prevented in the separator in which the heat-resistant porous layer is formed on one side of the porous substrate, and the production performance of the battery can be improved. Specifically, by setting the TD elastic modulus of the porous substrate to from 1.2 GPa to 5.0 GPa, that is, by improving the rigidity in TD of the porous substrate, shrinkage or deformation due to the heat-resistant porous layer can be suppressed, and a curling phenomenon in which the TD end portion of the separator is bent upward or downward with respect to a plane including the surface of the separator and deformed can be suppressed. As a result, in the battery production process, since there is no curved portion at the TD end portion of the separator when the strip-shaped separator is conveyed, the strip-shaped separator can be suitably laminated with the strip-shaped electrode sheet. As a result, the production performance of the battery can be improved.

Hereinafter, the details of the porous substrate and the heat-resistant porous layer included in the separator of the present disclosure will be described.

[Porous Substrate]

In the present disclosure, the porous substrate uses a polyolefin porous film, and may be a film made of a polyolefin porous film or a composite film including a polyolefin porous film and other films. Here, the porous film means a film having a structure in which a large number of micropores are provided inside thereof and these micropores are connected to each other, and through which a gas or a liquid can pass from one side to the other side.

It is preferred that the polyolefin porous film contains polyethylene, from the viewpoint of exhibiting the shutdown function, and the content of polyethylene is preferably 30% by mass or more with respect to the total mass of the polyolefin porous film.

From the viewpoint of imparting heat resistance to the extent that the film is not easily broken when exposed to a high temperature, the polyolefin porous film may be a microporous film containing polypropylene.

From the viewpoint of imparting shutdown function and heat resistance that the film is not easily broken when exposed to a high temperature, the polyolefin porous film may be a polyolefin porous film containing polyethylene and polypropylene. As the polyolefin porous film, a microporous film in which polyethylene and polypropylene are present in a mixed state in a layer may be mentioned. It is preferred that the microporous film contains 95% by mass or more of polyethylene and 5% by mass or less of polypropylene, from the viewpoint of compatibility of the shutdown function and heat resistance. In addition, from the viewpoint of compatibility of the shutdown function and heat resistance, a polyolefin porous film having a lamination structure with two or more layers, in which at least one layer contains polyethylene and at least one layer contains polypropylene, is also preferred.

As the polyolefin contained in the polyolefin porous film, a polyolefin having a weight-average molecular weight (Mw) of from 100,000 to 5,000,000 is preferred. In the case that the polyolefin has a Mw of 100,000 or more, sufficient mechanical properties may be provided to the microporous film. Meanwhile, the polyolefin has a Mw of 5,000,000 or less, the shutdown characteristic of the microporous film is favorable, and film molding of the microporous film is easy.

The weight-average molecular weight is obtained by dissolving a sample of a polyolefin porous film in o-dichlorobenzene under heating, and measuring a weight-average molecular weight by GPC (Alliance GPC 2000 type produced by Waters Corporation, column; GMH6-HT and GMH6-HTL) under the conditions of a column temperature of 135° C. and a flow rate of 1.0 mL/min. For calibration of the molecular weight, molecular weight monodisperse polystyrene (manufactured by Tosoh Corporation) can be used.

Examples of the method for manufacturing the polyolefin porous film include, a method containing extruding a molten polyolefin resin from a T-die to form a sheet, crystallizing and elongating the sheet, and further subjecting the sheet to heat treatment, thereby obtaining a microporous film; and a method containing extruding a polyolefin resin melted with a plasticizer such as liquid paraffin from a T-die, cooling it to form a sheet, elongating the sheet, extracting the plasticizer, and performing heat treatment, thereby obtaining a microporous film.

The surface of the porous substrate may be subjected to various surface treatments within the range of not impairing the nature of the porous substrate, for the purpose of improving wettability with the coating liquid for forming the heat-resistant porous layer. As the surface treatment, corona treatment, plasma treatment, flame treatment, UV irradiation treatment, and the like may be mentioned.

—Characteristics of Porous Substrate—

In the present disclosure, it is important that a TD elastic modulus of the porous substrate is from 1.2 GPa to 5.0 GPa.

The TD elastic modulus refers to the elastic modulus in TD of the porous substrate.

When the TD elastic modulus of the porous substrate is 1.2 GPa or more, the shrinkage or deformation due to the heat-resistant porous layer can be suppressed, and the curling phenomenon of the separator can be suitably prevented. From such a viewpoint, the TD elastic modulus of the porous substrate may be 1.5 GPa or more, or 2.0 GPa or more. From the same viewpoint, the TD elastic modulus of the porous substrate is preferably in a range of from 1.2 GPa to 2.0 GPa.

On the other hand, when the TD elastic modulus of the porous substrate is 5.0 GPa or less, it is preferable from the viewpoint of improving the handleability. From such a viewpoint, the TD elastic modulus of the porous substrate is more preferably 4.0 GPa or less, and still more preferably 3.5 GPa or less.

In the present disclosure, the MD elastic modulus of the porous substrate is preferably from 1.5 GPa to 5.0 GPa.

The MD elastic modulus refers to the elastic modulus in MD of the porous substrate.

Here, the elastic modulus of the porous substrate is a value measured by the following method.

When the TD elastic modulus is measured, the porous substrate is cut into a size of 100 mm along the TD direction and 10 mm along the MD direction to obtain a sample. When the MD elastic modulus is measured, the porous substrate is cut into a size of 100 mm along the MD direction and 10 mm along the TD direction to obtain a sample. Each of the cut samples is subjected to a tensile test under the conditions of a load cell load of 5 kgf, a distance between chucks of 50 mm, and a test speed of 100 mm/min using a tensile tester (RTG-1210 produced by A & D Company, Limited). The TD elastic modulus (GPa) and the MD elastic modulus (GPa) can be determined by dividing the obtained value by the cross-sectional area of the porous substrate.

The cross-sectional area at the time of calculating the TD elastic modulus is obtained by the film thickness×the length of the sample in the MD direction (10 mm). The cross-sectional area at the time of calculating the MD elastic modulus is obtained by the film thickness×the length of the sample in the TD direction (10 mm). The film thickness can be measured by the method described below.

The thickness (T1) of the porous substrate is preferably 25.0 μm or less, and more preferably 15.0 μm or less from the viewpoint of having favorable mechanical characteristics and increasing the energy density of the battery, and is preferably 4.0 μm or more, and more preferably 6.0 μm or more from the viewpoint of the production yield of the separator and the production yield of the battery.

The thickness of the porous substrate is a value measured using a contact type thickness meter (LITEMATIC manufactured by Mitutoyo Corporation). As the measurement terminal, a cylindrical terminal having a diameter of 5 mm is used. The measurement is adjusted so that a load of 7 g is applied, and an average value thereof is calculated by measuring arbitrary 20 points within 10 cm×10 cm.

The Gurley value of the porous substrate (JIS P8117: 2009) is preferably from 50 sec/100 ml to 400 sec/100 ml from the viewpoint of ion permeability or suppression of battery short circuit.

The porosity of the porous substrate is preferably 20% to 60% from the viewpoint of obtaining appropriate membrane resistance and shutdown function. The porosity of the porous substrate is obtained according to the following calculation method. That is, when the constituent materials are a, b, c, . . . , and n, the masses of the constituent materials are Wa, Wb, Wc, . . . , and Wn (g/cm2), a true density of the constituent materials are da, db, dc, . . . , and do (g/cm3), and a film thickness is t (cm), a porosity c (%) is obtained from the following formula.

$$\varepsilon = \{1-(Wa/da+Wb/db+Wc/dc+ \ldots +Wn/dn)/t\} \times 100$$

The porous substrate preferably has an average pore size of from 15 nm to 100 nm from the viewpoint of ion permeability or suppression of battery short circuit.

The average pore size of the porous substrate is measured using a palm porometer according to ASTM E1294-89.

The puncture strength of the porous substrate is preferably 200 gf (2.0N) or more from the viewpoint of production yield of the separator and production yield of the battery.

The puncture strength of the porous substrate is measured by performing a puncture test under the condition of a curvature radius of a needle tip of 0.5 mm, and a puncture speed of 2 mm/sec, using a KES-G5 handy compression tester from KATO TECH CO., LTD., to obtain a maximum puncture load (go.

[Heat-Resistant Porous Layer]

In the separator of the present disclosure, the heat-resistant porous layer contains at least a heat-resistant resin and a filler. The heat-resistant porous layer is a layer having a large number of micropores and allowing gas or liquid to pass therethrough from one side to the other side.

In the separator of the present disclosure, the heat-resistant porous layer is provided only on one side of the porous substrate.

Since the heat-resistant porous layer is provided only on one side of the porous substrate, the surface of the porous substrate on which the heat-resistant porous layer is not provided can be brought into contact with the winding core during the production of the battery. Accordingly, the winding failure can be prevented. In addition, when the heat-resistant porous layer is present only on one side of the porous substrate, the ion permeability of the separator is more excellent. In addition, since the thickness of the entire separator can be reduced, the battery having the higher energy density can be manufactured.

—Heat-Resistant Resin—

The kind of the heat-resistant resin of the heat-resistant porous layer is not particularly limited as long as it can bind the filler. The heat-resistant resin is preferably a resin that is stable with respect to an electrolytic solution and is also electrochemically stable. The heat-resistant resins may be used singly or in combination of two or more kinds thereof.

As the heat-resistant resin, wholly aromatic polyamide, polyamideimide, poly-N-vinylacetamide, polyacrylamide, copolymerized polyetherpolyamide, polyimide, or polyetherimide is preferable from the viewpoint of excellent heat resistance.

Among the heat-resistant resins, the wholly aromatic polyamides are preferable from the viewpoint of durability. The wholly aromatic polyamide may be meta-type or para-type. Among the wholly aromatic polyamides, the meta-wholly aromatic polyamide is preferable from the viewpoint of easily forming a porous layer and excellent oxidation reduction resistance in the electrode reaction. The wholly aromatic polyamide may be copolymerized with a small amount of an aliphatic monomer.

Specifically, the wholly aromatic polyamide is preferably polymetaphenylene isophthalamide, polyparaphenylene terephthalamide, or copolyparaphenylene 3.4'oxydiphenylene terephthalamide, and more preferably polymetaphenylene isophthalamide.

—Other Resins—

The heat-resistant porous layer in the separator of the present disclosure may contain a resin other than the heat-resistant resin.

The other resin is used for the purpose of, for example, improving adhesion of the heat-resistant porous layer to the electrode, and adjusting the ion permeability or film resistance of the heat-resistant porous layer. Examples of other resins include acrylic type resins, homopolymers or copolymers of vinyl nitrile compounds (acrylonitrile, methacrylonitrile, and the like), carboxymethyl cellulose, hydroxyalkyl cellulose, polyvinyl butyral, polyvinyl pyrrolidone, and polyethers (plyethylene oxide, polypropylene oxide, and the like), and the like.

In the separator of the present disclosure, the total content of the other resin other than the heat-resistant resin contained in the heat-resistant porous layer is preferably 5% by mass or less, more preferably 3% by mass or less, and still more preferably 1% by mass or less with respect to the total amount of the resin contained in the heat-resistant porous layer.

—Filler—

The heat-resistant porous layer in the present disclosure contains a filler composed of an inorganic substance or an organic substance.

When the heat-resistant porous layer contains the filler, the heat resistance and the electrolytic solution affinity of the separator can be improved. In this case, it is preferable to set the content and the particle size to such an extent that the effect in the present disclosure is not hindered.

The average primary particle diameter of the filler is preferably from 0.005 μm to 1.5 μm. When the average primary particle diameter of the filler is 0.005 μm or more, the cohesiveness of the filler is suppressed, and the uniformity of the heat-resistant porous layer can be kept high. When the average primary particle diameter of the filler is 1.5 μm or less, there are few protrusions protruding from the surface of the heat-resistant porous layer, and the shrinkage of the heat-resistant porous layer when exposed to a high temperature can be suppressed, which is advantageous.

For the same reason as described above, the average primary particle diameter of the filler is more preferably from 0.005 μm to 1.0 μm, more preferably from 0.01 μm to 0.95 μm, and still more preferably from 0.05 μm to 0.90 μm.

The average primary particle diameter of the filler is determined by measuring major axes of 100 randomly selected filler particles in observation with a scanning electron microscope (SEM) and averaging the major axes of the 100 particles. As a sample to be subjected to the SEM observation, filler particles as a material of the heat-resistant porous layer or filler particles taken out of the separator are used. A method of taking filler particles out of the separator is not limited. Examples thereof include a method of heating the separator to about 800° C. to cause the binder resin to disappear and taking out the filler particles, and a method of impregnating the separator with an organic solvent to dissolve the binder resin in the organic solvent and taking out the filler particles. When the average primary particle diameter of the filler is small, or when the aggregation of the filler is remarkable and the major diameter of the filler cannot be measured, the specific surface area of the filler is measured by the BET method, and assuming that the filler is a true sphere, the particle size can be calculated from the specific gravity and the specific surface area of the filler according to the following formula.

Particle diameter=6/(specific gravity×specific surface area)

Note that in the measurement of the specific surface area by the BET method, an inert gas is used as an adsorbent, and the adsorbent is adsorbed onto the surfaces of the filler particles at a boiling point temperature (−196° C.) of liquid nitrogen. The amount of gas adsorbed to the sample is measured as a function of the pressure of the adsorbent, and the specific surface area of the sample is determined from the adsorption amount.

It is preferred that the particle size distribution of the filler is 0.1 μm<d90−d10<3.0 μm, wherein d10 denotes a 10% cumulative particle diameter (μm) in the volume-based particle size distribution calculated from the small particle side; and d90 denotes a 90% cumulative particle diameter (μm) in the volume-based particle size distribution calculated from the small particle side. The particle size distribution is measured using for example, a laser diffraction type particle size distribution measuring apparatus (e.g., Mastersizer 2000, a product available from Sysmex Corporation), water as a dispersion solvent, and a non-ionic surfactant, Triton X-100 as a dispersing agent.

The particle shape of the filler is not limited, and may be a shape close to a sphere, or a plate shape, but from the viewpoint of the short circuit inhibition of the battery, the plate-shaped particles are preferred, and non-agglomerated primary particles are preferred.

The content of the filler contained in the heat-resistant porous layer is preferably from 30% by volume to 85% by volume with respect to the total solid content of the heat-resistant porous layer. When the filler content is 30% by volume or more, the separator heat resistance and cell strength should be further improved as well as the battery safety should also be secured. From this viewpoint, 35% by volume or higher is more preferable, and 40% by volume or higher is still more preferable. When the filler content is 85% by volume or less, the peal strength of the heat-resistant porous layer can be improved. From this viewpoint, 80% by volume or lower is more preferable and 75% by volume or lower is still more preferable.

It is preferred that the inorganic filler in the present disclosure is stable to the electrolyte solution, while being electrochemically stable. It is preferable that the filler contains at least one selected from the group consisting of a metal oxide, a metal hydroxide, a metal nitride, a metal salt, and a clay. Specific example of the inorganic filler include, metal hydroxides such as magnesium hydroxide, aluminum hydroxide, calcium hydroxide, chromium hydroxide, zirconium hydroxide, cerium hydroxide, nickel hydroxide and boron hydroxide; metal oxides such as magnesium oxide, alumina, boehmite (alumina monohydrate), titanic, silica, zirconia and barium titanate; carbonates such as magnesium carbonate and calcium carbonate; sulfates such as magnesium sulfate, calcium sulfate and barium sulfate; metal fluoride such as magnesium fluoride and calcium fluoride; clay mineral such as calcium silicate and talc. These inorganic fillers may be used alone or in combination of two or more. The inorganic filler may be surface-modified by a silane coupling agent. In particular, the inorganic filler is preferably barium sulfate or magnesium hydroxide from the viewpoint that gas is hardly generated in the battery.

As the organic filler, a crosslinked acryl resin such as crosslinked methyl polymethacrylate and crosslinked polystyrene may be listed, and the crosslinked methyl polymethacrylate is preferred.

In the separator of the present disclosure, the heat-resistant porous layer may contain an additive, for example, a dispersant such as a surfactant, a wetting agent, an antifoaming agent, or a pH adjuster. The dispersant is added to a coating liquid for forming a heat-resistant porous layer for the purpose of improving dispersibility, coatability, or storage stability. The wetting agent, the antifoaming agent, or the pH adjuster is added to a coating liquid for forming a heat-resistant porous layer for the purpose of, for example, improving compatibility with the porous substrate, suppressing mixing of air into the coating liquid, or adjusting the pH.

~Characteristics of Heat-Resistant Porous Layer~

The thickness of the heat-resistant porous layer (T2) is preferably 0.5 μm or more per one side and more preferably 1.0 μm or more per one side from the viewpoint of heat resistance or handleability of the separator, and is preferably 5.0 μm or less per one side, and more preferably 4.0 μm or less per one side from the viewpoint of handleability of the separator or energy density of a battery.

The layer thickness of the heat-resistant porous layer is obtained by subtracting the film thickness of the porous substrate from the film thickness of the separator. As the method for measuring the thickness of the porous substrate, the above-described method can be adopted. The film thickness of the separator can also be measured in the same manner as in the porous substrate.

The mass of the heat-resistant porous layer per unit area is preferably 1.0 $g/m^2$ or more and more preferably 2.0 $g/m^2$ or more from the viewpoint of heat resistance or handleability of the separator, and is preferably 11.0 $g/m^2$ or less and more preferably 8.0 $g/m^2$ or less from the viewpoint of handleability of the separator or energy density of a battery.

In the present disclosure, the mass of the heat-resistant resin in the heat-resistant porous layer is preferably from 0.2 $g/m^2$ to 2.2 $g/m^2$. When the mass of the heat-resistant resin in the heat-resistant porous layer is 0.2 $g/m^2$ or more, the heat resistance of the separator is easily improved, which is preferable. From such a viewpoint, the mass of the heat-resistant resin is more preferably 0.5 $g/m^2$ or more, still more preferably 0.9 $g/m^2$ or more. When the mass of the heat-resistant resin in the heat-resistant porous layer is 2.2 $g/m^2$ or less, the curling of the separator can be further reduced, which is preferable. From such a viewpoint, the mass of the heat-resistant resin is more preferably 2.0 $g/m^2$ or less, still more preferably 1.8 $g/m^2$ or less.

The porosity of the heat-resistant porous layer is preferably 30% or more from the viewpoint of the ion permeability of the separator, and is preferably 80% or less from the viewpoint of the thermal dimensional stability of the separator. The method for determining the porosity of the heat-resistant porous layer is the same as the method for determining the porosity of the porous substrate.

The average pore size of the heat-resistant porous layer is preferably from 10 nm to 200 nm. In a case where the average pore size is 10 nm or more, when the heat-resistant porous layer is impregnated with an electrolytic solution, the pores are hardly blocked even if a resin contained in the heat-resistant porous layer swells. In a case where the average pore size is 200 nm or less, uniformity in ion transfer is high, and a battery has excellent cycle characteristics and load characteristics.

The average pore size (nm) of the heat-resistant porous layer is calculated by the following formula, assuming that all pores are cylindrical.

$$d = 4\ V/S$$

In the formula, d represents an average pore size (diameter) of the heat-resistant porous layer, V represents a pore volume per square meter of the heat-resistant porous layer, and S represents a pore surface area per square meter of the heat-resistant porous layer.

The pore volume V per square meter of the heat-resistant porous layer is calculated from the porosity of the heat-resistant porous layer.

The pore surface area S per square meter of the heat-resistant porous layer is determined by the following method.

First, a specific surface area ($m^2/g$) of the porous substrate and a specific surface area ($m^2/g$) of the separator are calculated from a nitrogen gas adsorption amount by applying a BET formula to a nitrogen gas adsorption method.

These specific surface areas (m²/g) are multiplied by basis weights (g/m²) of the porous substrate and the separator, respectively, to calculate a pore surface area per square meter. Then, the pore surface area per square meter of the porous substrate is subtracted from the pore surface area per square meter of the separator to calculate the pore surface area S per square meter of the heat-resistant porous layer.

The peel strength between the porous substrate and the heat-resistant porous layer is preferably 0.1 N/10 mm or more, more preferably 0.2 N/10 mm or more, and still more preferably 0.3 N/10 mm or more from the viewpoint of the handleability and heat resistance.

—Characteristics of Separator—

The thickness of the separator of the present disclosure is preferably 6.0 µm or more, and more preferably 7.0 µm or more from the viewpoint of the mechanical strength of the separator, and is preferably 25.0 µm or less, and more preferably 20.0 µm or less from the viewpoint of the energy density of the battery.

A thickness T1 of the porous substrate and a thickness T2 of the heat-resistant porous layer preferably have a relationship in which a ratio (T1/T2) of the thickness T1 of the porous substrate to the thickness T2 of the heat-resistant porous layer is from 0.8 to 10.0.

When T1/T2 is 0.8 or more, the curling of the separator can be further reduced, which is preferable. From such a viewpoint, T1/T2 is more preferably 0.9 or more and still more preferably 1.0 or more. When T1/T2 is 10.0 or less, heat resistance of the separator is easily improved, which is preferable. From such a viewpoint, T1/T2 is more preferably 9.0 or less, still more preferably 8.0 or less, and particularly preferably 5.0 or less.

Particularly, T1/T2 is preferably in a range of from 1.0 to 5.0.

The puncture strength of the separator of the present disclosure is preferably from 160 gf (1.6N) to 1000 gf (9.8N), and more preferably from 200 gf (2.0N) to 600 gf (5.9N) from the viewpoint of the mechanical strength of the separator or the short-circuit resistance of a battery. A method of measuring the puncture strength of the separator is similar to a method of measuring the puncture strength of the porous substrate.

The porosity of the separator of the present disclosure is preferably from 30% to 60% from the viewpoint of the handleability of the separator, the ion permeability thereof, or the mechanical strength thereof.

The separator of the present disclosure has a Gurley value (JIS P8117: 2009) of preferably from 50 seconds/100 mL to 800 seconds/100 mL, more preferably from 100 seconds/100 mL to 450 seconds/100 mL from the viewpoint of a balance between mechanical strength and ion permeability.

The separator of the present disclosure has, as a value obtained by subtracting a Gurley value of the porous substrate from a Gurley value of the separator, preferably 300 seconds/100 mL or less, more preferably 150 seconds/100 mL or less, still more preferably 100 seconds/100 mL or less from the viewpoint of ion permeability. A lower limit of the value obtained by subtracting a Gurley value of the porous substrate from a Gurley value of the separator is not particularly limited, but is usually 10 seconds/100 mL or more in the separator of the present disclosure.

The separator of the present disclosure preferably has a film resistance of from 1 Ω·cm² to 10 Ω·cm² from the viewpoint of load characteristics of a battery. Here, the film resistance of the separator refers to a resistance value in a state where the separator is impregnated with an electrolytic solution, and is measured by an AC method at 20° C. using 1 mol/L LiBF₄-propylene carbonate:ethylene carbonate (mass ratio 1:1) as the electrolytic solution.

The separator of the present disclosure preferably has a tortuosity ratio of from 1.2 to 2.8 from the viewpoint of ion permeability.

The amount of water (based on mass) contained in the separator of the present disclosure is preferably 1000 ppm or less. With a smaller amount of water in the separator, a reaction between an electrolytic solution and water can be further suppressed, and generation of gas in a battery can be further suppressed to improve the cycle characteristics of the battery in a case where the battery is formed. The amount of water contained in the separator is more preferably 800 ppm or less, and still more preferably 500 ppm or less from this viewpoint.

The separator of the present disclosure preferably has a thermal shrinkage rate of from 0% to 32% in both the MD and TD at 150° C. The thermal shrinkage rate of the separator at 150° C. is preferably 32% or less from the viewpoint of safety of the battery at a high temperature. From such a viewpoint, the thermal shrinkage rate of the separator at 150° C. is more preferably 28% or less, still more preferably 24% or less, and particularly preferably 20% or less.

The separator of the present disclosure may further include other layers other than the porous substrate and the heat-resistant porous layer. Examples of the other layers include an adhesive layer provided as an outermost layer mainly for adhesion with an electrode.

[Method of Producing Separator]

The separator of the present disclosure can be produced, for example, by forming the heat-resistant porous layer on the porous substrate by a wet coating method or a dry coating method. In the present disclosure, the wet coating method is a method of solidifying a coating layer in a coagulation liquid, and the dry coating method is a method of drying a coating layer to solidify the coating layer. Hereinafter, embodiment examples of the wet coating method will be described.

The wet coating method is a method of applying a coating liquid containing a heat-resistant resin and a filler onto a porous substrate, immersing the resulting product in a coagulation liquid to solidify the coating layer, pulling the resulting product out of the coagulation liquid, washing the resulting product with water, and drying the resulting product.

The coating liquid for forming the heat-resistant porous layer is prepared by dissolving or dispersing the heat-resistant resin and a filler in a solvent. In the coating liquid, a component other than the heat-resistant resin and the filler is dissolved or dispersed, if necessary.

A solvent used for preparing the coating liquid includes a solvent that dissolves the heat-resistant resin (hereinafter, also referred to as "good solvent"). Examples of the good solvent include a polar amide solvent such as N-methylpyrrolidone, dimethylacetamide, or dimethylformamide.

The solvent used for preparing the coating liquid preferably contains a phase separation agent that induces phase separation from the viewpoint of forming a porous layer having a favorable porous structure. Therefore, the solvent used for preparing the coating liquid is preferably a mixed solvent of a good solvent and a phase separation agent. The phase separation agent is preferably mixed with a good solvent in such an amount that a viscosity suitable for coating can be ensured. Examples of the phase separation agent include water, methanol, ethanol, propyl alcohol, butyl alcohol, butanediol, ethylene glycol, propylene glycol, and tripropylene glycol.

The solvent used for preparing the coating liquid is preferably a mixed solvent of a good solvent and a phase separation agent, containing 60% by mass or more of the good solvent and 40% by mass or less of the phase separation agent from the viewpoint of forming a favorable porous structure.

The resin concentration of the coating liquid is preferably from 1% by mass to 20% by mass from the viewpoint of forming a favorable porous structure. The filler concentration of the coating liquid is preferably from 2% by mass to 50% by mass from the viewpoint of forming a favorable porous structure.

Examples of a means of applying the coating liquid to the porous substrate include a Meyer bar, a die coater, a reverse roll coater, a roll coater, and a gravure coater.

The coating layer is solidified by immersing the porous substrate on which the coating layer is formed in a coagulation liquid, and solidifying the heat-resistant resin while phase separation is induced in the coating layer. As a result, a laminated body composed of the porous substrate and the heat-resistant porous layer is obtained.

The coagulation liquid generally contains the good solvent and the phase separation agent used for preparing the coating liquid, and water. A mixing ratio between the good solvent and the phase separation agent is preferably matched with the mixing ratio of the mixed solvent used for preparing the coating liquid in terms of production. The content of water in the coagulation liquid is preferably from 40% by mass to 90% by mass from viewpoints of formation of a porous structure and productivity. The temperature of the coagulation liquid is, for example, from 20° C. to 50° C.

After the coating layer is solidified in the coagulation liquid, the laminated body is pulled out of the coagulation liquid and washed with water. By washing the laminated body with water, the coagulation liquid is removed from the laminated body. Furthermore, by drying the laminated body, water is removed from the laminated body. Washing with water is performed, for example, by transporting the laminated body in a water washing bath. Drying is performed, for example, by transporting the laminated body in a high-temperature environment, blowing air to the laminated body, or bringing the laminated body into contact with a heat roll. The drying temperature is preferably from 40° C. to 80° C.

The separator of the present disclosure can also be produced by a dry coating method. The dry coating method is a method of applying a coating liquid to a porous substrate, drying the coating layer to remove a solvent by evaporation, and thereby forming a heat-resistant porous layer on the porous substrate. However, in the dry coating method, since the coating layer after drying tends to be dense as compared with the wet coating method, the wet coating method is more preferable in that the favorable porous structure can be obtained.

The separator of the present disclosure can also be produced by a method of preparing a heat-resistant porous layer as an independent sheet, stacking the heat-resistant porous layer on a porous substrate, and forming a composite by thermal press bonding or an adhesive. Examples of the method of preparing a heat-resistant porous layer as an independent sheet include a method of forming a heat-resistant porous layer on a release sheet by applying the above-described wet coating method or dry coating method.

<Non-Aqueous Secondary Battery>

A non-aqueous secondary battery of the present disclosure is a non-aqueous secondary battery that obtains an electromotive force by doping/dedoping lithium, and includes a positive electrode, a negative electrode, and a separator for a non-aqueous secondary battery of the present disclosure. The doping means occlusion, support, adsorption, or insertion, and means a phenomenon that lithium ions enter an active material of an electrode such as a positive electrode.

The non-aqueous secondary battery of the present disclosure has a structure in which, for example, a battery element in which a negative electrode and a positive electrode face each other with a separator interposed therebetween is enclosed in an exterior material together with an electrolytic solution. The non-aqueous secondary battery of the present disclosure is suitable for a non-aqueous electrolyte secondary battery, particularly for a lithium ion secondary battery.

Hereinafter, aspect examples of the positive electrode, negative electrode, electrolyte solution, and exterior material included in the non-aqueous secondary battery according to the present disclosure will be described.

Examples of an embodiment of the positive electrode include a structure in which an active material layer containing a positive electrode active material and a binder resin is formed on a current collector. The active material layer may further contain a conductive auxiliary agent. Examples of the positive electrode active material include a lithium-containing transition metal oxide, and specific examples thereof include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$. Examples of the binder resin include a polyvinylidene fluoride type resin, and a styrene-butadiene copolymer. Examples of the conductive auxiliary agent include carbon materials such as acetylene black, Ketjen black, and graphite powder. Examples of the current collector include an aluminum foil, a titanium foil, and a stainless steel foil, each having a thickness of from 5 μm to 20 μm.

In the non-aqueous secondary battery has excellent oxidation resistance, when the heat-resistant porous layer is disposed by contacting the positive electrode of the non-aqueous secondary battery, a positive electrode active material that can be operated at a high voltage of 4.2 V or more, such as $LiMn_{1/2}Ni_{1/2}O_2$ and $LiCo_{1/3}Mn_{1/3}Ni_{1/3}O_2$, can be easily applicable.

Examples of an embodiment of the negative electrode include a structure in which an active material layer containing a negative electrode active material and a binder resin is formed on a current collector. The active material layer may further contain a conductive auxiliary agent. Examples of the negative electrode active material include materials capable of electrochemically occluding lithium. Specific examples thereof include carbon materials; and alloys of lithium in combination with silicon, tin, aluminum; wood's alloy, or the like. Examples of the binder resin include a polyvinylidene fluoride type resin and a styrene-butadiene copolymer. Examples of the conductive auxiliary agent include carbon materials such as acetylene black, Ketjen black, and graphite powder. Examples of the current collector include a copper foil, a nickel foil, and a stainless steel foil, each having a thickness of from 5 μm to 20 μm. Instead of using the negative electrode described above, a metal lithium foil may be used as the negative electrode.

The electrolyte solution is, for example, a solution in which a lithium salt is dissolved in a non-aqueous solvent. Examples of the lithium salt include $LiPF_6$, $LiBF_4$, and $LiClO_4$. Examples of the non-aqueous solvent include cyclic carbonates such as ethylene carbonate, propylene carbonate, fluoroethylene carbonate, difluoroethylene carbonate, and vinylene carbonate; chain carbonates such as dimethyl carbonate, diethyl carbonate, ethyl methyl carbonate, and a fluorine-substituted compound thereof; and cyclic esters such as γ-butyrolactone and γ-valerolactone. These non-aqueous solvent may be used singly, or in combination. As the electrolyte solution, a solution is preferred, which is obtained by mixing a cyclic carbonate and a chain carbonate at a mass ratio (cyclic carbonate:chain carbonate) of from 20:80 to 40:60, and dissolving a lithium salt therein to give a concentration of from 0.5 mol/L to 1.5 mol/L.

Examples of the exterior material include a metal can and an aluminum laminated film pack. The shape of the battery may be a square shape, a cylindrical shape, a coin shape, and the like, but the separator of the present disclosure is suitable for any one of these shapes.

The non-aqueous secondary battery of the present disclosure can be produced by disposing the separator of the present disclosure between a positive electrode and a negative electrode, winding the resulting product in a length direction to produce a wound body, and then housing this wound body in the exterior material, and sealing by injecting an electrolytic solution therein. The same applies to a case of using an element produced by a method of stacking at least one layer of a positive electrode, at least one layer of a separator, and at least one layer of a negative electrode in this order (a so-called stack method) instead of the wound body.

EXAMPLES

Hereinafter, the separator and the non-aqueous secondary battery of the present disclosure will be described more specifically with reference to Examples. Materials, used amounts, ratios, treatment procedures, and the like illustrated in the following Examples can be changed, if appropriate without departing from the spirit of the present disclosure. Therefore, the range of the separator and the non-aqueous secondary battery of the present disclosure should not be construed as being limited by the specific examples described below.
<Measurement Method and Evaluation Method>

Measurement methods and evaluation methods applied in Examples and Comparative Examples are as follows.
[Elastic Modulus of Porous Substrate]

When the TD elastic modulus is measured, the porous substrate is cut into a size of 100 mm along the TD direction and 10 mm along the MD direction. When the MD elastic modulus is measured, the porous substrate is cut into a size of 100 mm along the MD direction and 10 mm along the TD direction. Each of the cut samples was subjected to a tensile test under the conditions of a load cell load of 5 kgf, a distance between chucks of 50 mm, and a test speed of 100 mm/min using a tensile tester (RTG-1210 manufactured by A & D Company, Limited). The TD elastic modulus (GPa) and the MD elastic modulus (GPa) were obtained by dividing the obtained value by the cross-sectional area of the porous substrate. The cross-sectional area when calculating the TD elastic modulus was calculated by the film thickness×the length of the sample in the MD direction (10 mm), and the cross-sectional area when calculating the MD elastic modulus was the film thickness×the length of the sample in the TD direction (10 mm). Note that the film thickness was measured by the method described below.
[Average Primary Particle Diameter of Filler]

The inorganic filler before being added to the coating liquid for forming the heat-resistant porous layer was used as a sample.

The average primary particle diameter of the magnesium hydroxide particles and the aluminum hydroxide particles was determined by measuring the major diameters of 100 filler particles randomly selected in observation with a scanning electron microscope (SEM), and averaging the major diameters of 100 filler particles.

Since the average primary particle diameter of the prepared barium sulfate particles was difficult to measure the major diameter of the primary particles by the SEM, the specific gravity ($g/cm^3$) and the BET specific surface area ($m^2/g$) were each measured, and the average primary particle diameter was determined according to the following formula assuming that the barium sulfate particles were spherical. As an apparatus for measuring the BET specific surface area, ASAP 2020 manufactured by Micromeritics was used.

Average primary particle diameter ($\mu m$)=6÷[specific gravity ($g/cm^3$)×BET specific surface area ($m^2/g$)]

[Film Thickness]

The film thicknesses of the porous substrate and the separator were measured using a contact type thickness meter (LITEMATIC manufactured by Mitutoyo Corporation). A cylindrical measurement terminal having a diameter of 5 mm was used, the measurement was performed by adjusting a load of 7 g to be applied during the measurement, arbitrary 20 points within 10 cm×10 cm were measured, and an average value thereof was calculated.

The layer thickness of the heat-resistant porous layer was obtained by subtracting the film thickness of the porous substrate from the film thickness of the separator.
[Porosity]

The porosities of the porous substrate and the separator were obtained according to the following calculation method.

When the constituent materials are a, b, c, . . . , and n, the masses of the constituent materials are Wa, Wb, Wc, . . . , and Wn ($g/cm^2$), a true density of the constituent materials are da, db, dc, . . . , and do ($g/cm^3$), and a film thickness is t (cm), a porosity ε (%) is obtained from the following formula.

$$\varepsilon = \{1-(Wa/da+Wb/db+Wc/dc+ \ldots +Wn/dn)/t\} \times 100$$

[Basis Weight]

The separator for a non-aqueous secondary battery coated with a heat-resistant porous layer as a sample and the polyethylene microporous film used for the separator were cut into 10 cm×10 cm, weighed, and converted into a weight per 1 $m^2$ to obtain the basis weight of each separator. The basis weight of the heat-resistant porous layer was determined from the difference in basis weight.
[Mass of Heat-Resistant Resin]

The mass of the heat-resistant resin was calculated from the basis weight of the heat-resistant layer and the polymer ratio according to the following formula. The polymer ratio is the ratio of the mass of the heat-resistant resin to the total solid content mass of the heat-resistant porous layer.

Mass of heat-resistant resin ($g/m^2$)=basis weight of heat-resistant layer×polymer ratio

[Gurley Value]

The Gurley value of each of the porous substrate and the separator was measured by a Gurley type densometer (G-B2C, manufactured by Toyo Seiki Seisaku-sho, Ltd.) according to JIS P8117: 2009.
[Thermal Shrinkage Ratio by Heat Treatment]

The separator for a non-aqueous secondary battery was cut out into a size of 180 mm in an MD direction×60 mm in a TD direction to prepare a test piece. The test piece was marked at points of 10 mm and 50 mm from one end on a line bisecting the test piece in an MD direction (referred to as points A and B, respectively). Further, the test piece was marked at points 20 mm and 170 mm from one end on a line bisecting the test piece in a TD direction (referred to as points C and D, respectively). A clip was attached to the test piece (a point where the clip was attached was between the point C and an end closest to the point C). The test piece was hung in an oven in which the temperature was adjusted to 150° C. to be heated under no tension for 0.5 hour. A length between A and B and a length between C and D were measured before and after the heat treatment, and a TD and an MD thermal shrinkage ratios were calculated by the following formulae. Furthermore, the thermal shrinkage ratios of the 10 test pieces were averaged.

TD thermal shrinkage ratio (%)={1−(length between
A and B after heat treatment÷length between A
and B before heat treatment)}×100

MD thermal shrinkage ratio (%)={1−(length between
C and D after heat treatment÷length between C
and D before heat treatment)}×100

[Curling]

A separator for a non-aqueous secondary battery cut out to have a length of a side parallel to the MD direction of 20 cm and a length of a side parallel to the TD direction of 6 cm was used as a sample. This sample was allowed to stand horizontally for 10 minutes in an environment at a temperature of 25° C. and a humidity of 25%, and then the projected area in plan view was measured. The projected area in plan view was measured on the basis of an image obtained by placing the cut sample on a square sheet, photographing the sample in a state where a center of a digital camera was separated from the center of the sample by 40 cm in the vertical direction, and measuring the projected area. In addition, the projected area was rounded off to the first place. Based on the obtained value, the curling rate was measured based on the following formula.

Curling ratio (%)={1−(projected area cm$^2$ after
standing for 10 minutes)÷120 cm$^2$}×100

<Production of Separator>

Example 1

A meta-wholly aromatic polyamide (CONEX manufactured by Teijin Techno Products Limited) was dissolved in a mixed solvent of dimethylacetamide (DMAc) and tripropylene glycol (TPG) (DMAc:TPG=80:20 [mass ratio]) so as to have 5% by mass of polymer concentration, and Mg(OH)$_2$ particles (KISMA 5p manufactured by Kyowa Chemical Industry Co., Ltd., average primary particle diameter 0.8 μm) as a filler were further stirred and mixed to obtain a coating liquid (A). The mass ratio of the meta-wholly aromatic polyamide to the filler (polyamide/filler) in the coating fluid (A) was set to 20/80.

An appropriate amount of the coating liquid (A) was placed on the Meyer bar, and the coating liquid (A) was applied to one side of a polyethylene microporous film (thickness 10.8 μm, porosity 42.6%, TD elastic modulus 1.3 GPa, and Gurley value 140 seconds/100 mL). The polyethylene microporous film on which the coating film was formed was immersed in a coagulation liquid (DMAc:TPG:water=30:8:62 [mass ratio], and liquid temperature 40° C.) to solidify the coating film, then washed in a water washing tank at a water temperature of 40° C., and dried. In this way, a separator in which a heat-resistant porous layer was formed on one side of the polyethylene microporous film was obtained.

Note that FIG. 1 illustrates a photograph of the separator of Example 1 taken in plan view after standing for 10 minutes when a test for measuring the curling ratio was conducted. The separator of Example 1 had a curling ratio of 0%, and as illustrated in FIG. 1, the separator was kept flat to such an extent that the frame line of 6 cm×20 cm described on the grid paper was hardly visible.

Examples 2 and 3

A separator was prepared in a manner similar to Example 1 except that, in Example 1, a thicknesses and the like of a porous substrate and a heat-resistant porous layer were changed as shown in Table 1.

Example 4

The meta-wholly aromatic polyamide was dissolved in dimethylacetamide (DMAc) so as to have 5% by mass of polymer concentration, and BaSO$_4$ particles (average primary particle diameter: 0.05 μm) as a filler were further stirred and mixed to obtain a coating liquid (B). The mass ratio of the meta-wholly aromatic polyamide to the filler (polyamide/filler) in the coating liquid (B) was set to 20/80.

An appropriate amount of the coating liquid (B) was placed on the Meyer bar, and the coating liquid (B) was applied to one side of a polyethylene microporous film (thickness 10.0 μm, porosity 39.1%, TD elastic modulus 2.5 GPa, and Gurley value 158 seconds/100 mL). The polyethylene microporous film on which the coating film was formed was immersed in a coagulation liquid (DMAc:TPG:water=30:8:62 [mass ratio], and liquid temperature 40° C.) to solidify the coating film, then washed in a water washing tank at a water temperature of 40° C., and dried. In this way, a separator in which a heat-resistant porous layer was formed on one side of the polyethylene microporous film was obtained.

Examples 5 to 7

A separator was prepared in a manner similar to Example 4 except that, in Example 4, a thicknesses and the like of a heat-resistant porous layer were changed as shown in Table 1.

Example 8

A separator was prepared in a manner similar to Example 4 except that a polymer concentration was 9% by mass, a filler was changed from BaSO$_4$ particles to Al(OH)$_3$ particles (average primary particle diameter: 1.5 μm), and a polymer/filler ratio (mass ratio) was changed from 20/80 to 40/60 in Example 4.

Example 9

A separator was prepared in a manner similar to Example 4 except that a polymer was polyimide and a thickness and the like of a heat-resistant layer were changed as shown in Table 1 in Example 4.

Comparative Example 1

A separator was prepared in a manner similar to Example 1 except that in Example 1, a polymer concentration was 9% by mass, the Mg(OH)$_2$ particles were replaced with other Mg(OH)$_2$ particles (average primary particle diameter: 0.5 µm), a polymer/filler ratio was changed from 20/80 to 40/60, and a porous substrate was changed as shown in Table 1.

Figure 2:
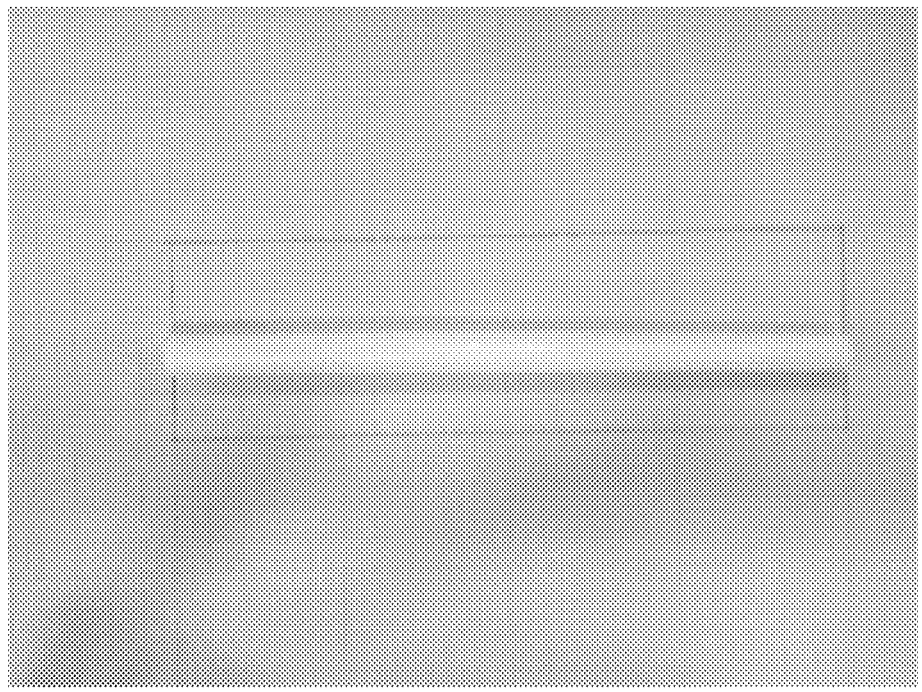
FIG. 2 is a photograph of a separator of Comparative Example 1 taken in plan view after standing for 10 minutes when a test for measuring a curling rate was conducted.

Note that FIG. 2 illustrates a photograph of the separator of Comparative Example 1 taken in plan view after standing for 10 minutes when a test for measuring the curling ratio was conducted. In the separator of Comparative Example 1, a curling ratio was 83%, and as shown in FIG. 2, the separator was kept in a rounded state with a direction substantially parallel to a MD direction as an axis to such an extent that the frame line of 6 cm×20 cm described on a rectangular parallelepiped paper was almost clearly visible.

Comparative Example 2

Except that an elastic modulus and the like of the porous substrate in Example 1 were changed as shown in Table 1, the same procedure as in Example 1 was carried out to prepare the separator.

The composition, physical properties, and evaluation results of each separator of Examples 1 to 9 and Comparative Examples 1 and 2 are shown in Table 1.

The disclosure of Japanese Patent Application No. 2019-052383 filed on Mar. 20, 2019 is incorporated herein by reference in its entirety.

All documents, patent applications, and technical standards described in this specification are incorporated herein by reference to the same extent as if each individual document, patent application, and technical standards were specifically and individually indicated to be incorporated herein by reference.

The invention claimed is:

1. A separator for a non-aqueous secondary battery, the separator comprising:
   a porous substrate using a polyolefin porous film; and
   a heat-resistant porous layer that is provided only on one side of the porous substrate, and that contains a heat-resistant resin and a filler,
   wherein an elastic modulus in a transverse direction to a machine direction of the porous substrate is from 1.2 GPa to 5.0 GPa,
   wherein a mass of the heat-resistant resin in the heat-resistant porous layer is from 0.5 g/m$^2$ to 2.2 g/m$^2$, and

TABLE 1

| | Porous substrate | | | | | Heat-resistant porous layer | | | |
|---|---|---|---|---|---|---|---|---|---|
| | Material | Thickness T1 (µm) | Porosity (%) | Gurley value (sec/100 mL) | TD elastic modulus (GPa) | Polymer | Filler | Filler particle diameter (µm) | Polymer/filler ratio (mass ratio) |
| Example 1 | PE | 10.8 | 42.6 | 140 | 1.3 | Aramid | Mg(OH)$_2$ | 0.8 | 20/80 |
| Example 2 | PE | 9.9 | 35.5 | 161 | 1.5 | Aramid | Mg(OH)$_2$ | 0.8 | 20/80 |
| Example 3 | PE | 10.2 | 43.1 | 127 | 1.8 | Aramid | Mg(OH)$_2$ | 0.8 | 20/80 |
| Example 4 | PE | 10.0 | 39.1 | 158 | 2.5 | Aramid | BaSO$_4$ | 0.05 | 20/80 |
| Example 5 | PE | 10.0 | 39.1 | 158 | 2.5 | Aramid | BaSO$_4$ | 0.05 | 20/80 |
| Example 6 | PE | 10.0 | 39.1 | 158 | 2.5 | Aramid | BaSO$_4$ | 0.05 | 20/80 |
| Example 7 | PE | 10.0 | 39.1 | 158 | 2.5 | Aramid | BaSO$_4$ | 0.05 | 20/80 |
| Example 8 | PE | 10.0 | 39.1 | 158 | 2.5 | Aramid | Al(OH)$_3$ | 1.5 | 40/60 |
| Example 9 | PE | 10.0 | 39.1 | 158 | 2.5 | Polyimide | BaSO$_4$ | 0.05 | 20/80 |
| Comparative Example 1 | PE | 9.0 | 39.2 | 195 | 1.1 | Aramid | Mg(OH)$_2$ | 0.5 | 40/60 |
| Comparative Example 2 | PE | 10.9 | 41.0 | 138 | 1.0 | Aramid | Mg(OH)$_2$ | 0.8 | 20/80 |

| | Heat-resistant porous layer | | | | Separator property: characteristic | | | | |
|---|---|---|---|---|---|---|---|---|---|
| | Thickness T2 (µm) | Porosity (%) | Basis weight (g/m$^2$) | Mass of heat-resistant resin (g/m$^2$) | Thickness ratio (T1/T2) | Thickness (µm) | Gurley value (sec/100 mL) | Curling ratio (%) | Thermal shrinkage ratio at 150° C. (%) MD/TD |
| Example 1 | 3.3 | 61 | 2.7 | 0.5 | 3.3 | 14.1 | 201 | 0 | 26.0/16.2 |
| Example 2 | 3.9 | 67 | 2.6 | 0.5 | 2.5 | 13.8 | 212 | 0 | 27.5/19.2 |
| Example 3 | 4.4 | 63 | 3.3 | 0.7 | 2.3 | 14.6 | 170 | 0 | 27.4/19.2 |
| Example 4 | 4.6 | 65 | 4.7 | 0.9 | 2.2 | 14.6 | 218 | 17 | 10.1/6.8 |
| Example 5 | 4.9 | 62 | 5.0 | 1.0 | 2.0 | 14.9 | 220 | 8 | 9.8/6.5 |
| Example 6 | 10.0 | 66 | 10.9 | 2.2 | 1.0 | 20.0 | 268 | 0 | 8.2/5.8 |
| Example 7 | 1.0 | 68 | 1.0 | 0.2 | 10.0 | 11.0 | 166 | 25 | 33.8/20.9 |
| Example 8 | 3.3 | 63 | 2.7 | 1.1 | 3.0 | 13.3 | 190 | 8 | 36.1/21.6 |
| Example 9 | 4.2 | 70 | 5.0 | 1.0 | 2.4 | 14.2 | 219 | 8 | 23.1/14.0 |
| Comparative Example 1 | 5.3 | 61 | 3.7 | 1.5 | 1.7 | 14.3 | 318 | 83 | 10.3/9.0 |
| Comparative Example 2 | 3.3 | 60 | 2.6 | 0.5 | 3.3 | 14.2 | 197 | 83 | 27.0/14.6 |

As shown in Table 1, in Examples in which the TD elastic modulus of the porous substrate was from 1.2 GPa to 5.0 GPa, although the thermal shrinkage of the separator was not remarkably reduced, a remarkable suppressing effect on the occurrence of the curling was observed as compared with Comparative Examples.

wherein the polyolefin porous film contains polyethylene in an amount of 30% by mass or more with respect to a total mass of the polyolefin porous film.

2. The separator for a non-aqueous secondary battery according to claim 1, wherein a ratio T1/T2 of a thickness T1 of the porous substrate to a thickness T2 of the heat-resistant porous layer is from 0.8 to 10.

3. The separator for a non-aqueous secondary battery according to claim 1, wherein each of a shrinkage ratio of a machine direction at 150° C. and a shrinkage ratio of a transverse direction to the machine direction at 150° C. is within a range of from 0% to 32%.

4. The separator for a non-aqueous secondary battery according to claim 1, wherein the filler contains at least one selected from the group consisting of a metal oxide, a metal hydroxide, a metal nitride, a metal salt, and a clay.

5. The separator for a non-aqueous secondary battery according to claim 4, wherein the filler includes barium sulfate or magnesium hydroxide.

6. The separator for a non-aqueous secondary battery according to claim 1, wherein an average primary particle diameter of the filler is from 0.005 μm to 1.0 μm.

7. The separator for a non-aqueous secondary battery according to claim 1, wherein the heat-resistant resin contains at least one selected from the group consisting of wholly aromatic polyamide, polyamideimide, poly(N-vinylacetamide), polyacrylamide, copolymerized polyether polyamide, polyimide and polyether imide.

8. A non-aqueous secondary battery that obtains electromotive force by lithium doping and dedoping, the non-aqueous secondary battery comprising:
a positive electrode;
a negative electrode; and
the separator for a non-aqueous secondary battery according to claim 1, the separator being disposed between the positive electrode and the negative electrode.

9. The separator for a non-aqueous secondary battery according to claim 1, wherein the heat-resistant resin contains polymetaphenylene isophthalamide.

* * * * *